(12) United States Patent
Mecklenburg (10) Patent No.: US 10,994,946 B2
(45) Date of Patent: May 4, 2021

(54) ELECTROMAGNETIC STOPPER FOR A CARGO CONVEYOR SYSTEM

(71) Applicant: RHEFOR GBR, Berlin (DE)

(72) Inventor: Arno Mecklenburg, Berlin (DE)

(73) Assignee: RHEFOR GBR, Berlin (DE)

(*) Notice: Subject to any disclaimer, the term of this patent is extended or adjusted under 35 U.S.C. 154(b) by 0 days.

(21) Appl. No.: 16/482,696

(22) PCT Filed: Jan. 31, 2018

(86) PCT No.: PCT/EP2018/052443
§ 371 (c)(1),
(2) Date: Nov. 22, 2019

(87) PCT Pub. No.: WO2018/141817
PCT Pub. Date: Aug. 9, 2018

(65) Prior Publication Data
US 2020/0087079 A1     Mar. 19, 2020

(30) Foreign Application Priority Data

Feb. 1, 2017   (DE) ..................... 10 2017 000 907.4

(51) Int. Cl.
*B65G 47/29*     (2006.01)
*B65G 43/00*     (2006.01)
(Continued)

(52) U.S. Cl.
CPC ............ *B65G 47/29* (2013.01); *B65G 43/00* (2013.01); *B65G 47/8815* (2013.01);
(Continued)

(58) Field of Classification Search
CPC .. B65G 47/29; B65G 47/295; B65G 47/8815; B65G 47/8807; B65G 47/88
See application file for complete search history.

(56) References Cited

U.S. PATENT DOCUMENTS

| 4,320,371 A * | 3/1982 | Coyle .................. H01F 7/1607 |
| | | 335/256 |
| 4,397,386 A * | 8/1983 | Kampf ............... B65G 47/8815 |
| | | 193/32 |

(Continued)

FOREIGN PATENT DOCUMENTS

| DE | 2835404 A1 | 2/1980 |
| DE | 102007016039 A1 | 10/2008 |

(Continued)

OTHER PUBLICATIONS

ISA European Patent Office, International Search Report Issued in Application No. PCT/EP2018/052443, dated Apr. 16, 2018, WIPO, 6 pages.

*Primary Examiner* — William R Harp
(74) *Attorney, Agent, or Firm* — McCoy Russell LLP (57) ABSTRACT

The present invention relates to an electromagnetic stopper for stopping and/or separating out cargo carriers and/or cargo conveyed on a continuously operated cargo conveyor system, comprising:
- a bistable solenoid having at least one coil and at least one permanent magnet;
- a cam, which can be retracted and extended with the aid of the solenoid,
- one or more electrical energy stores, in particular capacitors,
- a controller, which, with the aid of switches, discharges the energy store(s) via the at least one coil of the solenoid such that the cam is extended.

19 Claims, 5 Drawing Sheets

(51) Int. Cl.
*B65G 47/88* (2006.01)
*H01F 7/16* (2006.01)
*H01F 7/18* (2006.01)

(52) U.S. Cl.
CPC ........ *H01F 7/1615* (2013.01); *H01F 7/1816* (2013.01); *B65G 2203/0233* (2013.01); *B65G 2203/042* (2013.01); *B65G 2205/00* (2013.01); *H01F 2007/1692* (2013.01)

(56) References Cited

U.S. PATENT DOCUMENTS

| | | | |
|---|---|---|---|
| 6,246,131 B1* | 6/2001 | Sheng | F16K 31/082 310/12.19 |
| 6,523,671 B2* | 2/2003 | McTaggart | B65G 47/266 198/345.1 |
| 6,791,442 B1 | 9/2004 | Schmidt | |
| 9,343,216 B2* | 5/2016 | Robertson | H01F 7/1615 |
| 10,024,453 B2* | 7/2018 | Robertson | H01F 7/064 |
| 2013/0201590 A1 | 8/2013 | Pantke | |
| 2015/0062770 A1 | 3/2015 | Robertson | |

FOREIGN PATENT DOCUMENTS

| | | |
|---|---|---|
| DE | 102013015525 A1 | 3/2015 |
| EP | 0794540 A1 | 9/1997 |
| EP | 2428472 A1 | 3/2012 |
| EP | 2822004 A1 | 1/2015 |
| GB | 2357375 A | 6/2001 |
| WO | 2008119785 A1 | 10/2008 |
| WO | 2008135670 A1 | 11/2008 |
| WO | 2015058742 A2 | 4/2015 |

* cited by examiner

ELECTROMAGNETIC STOPPER FOR A CARGO CONVEYOR SYSTEM

CROSS-REFERENCE TO RELATED APPLICATIONS

The present application is a U.S. National Phase of International Patent Application Serial No. PCT/EP2018/052443 entitled "ELECTROMAGNETIC STOPPER FOR AN ARTICLE CONVEYOR SYSTEM", filed on Jan. 31, 2018. International Patent Application Serial No. PCT/EP2018/052443 claims priority to German Patent Application No. 10 2017 000 907.4 filed on Feb. 1, 2017. The entire contents of each of the above-referenced applications are hereby incorporated by reference for all purposes.

TECHNICAL FIELD

The present invention relates to an electromagnetic stopper for stopping and/or for separating cargo carriers and/or cargo conveyed on a continuously operated cargo conveyor system.

BACKGROUND AND SUMMARY

Continuously operated cargo conveyor systems are used, for example, for in-house chaining, in particular to transport workpieces from one processing station to the next processing station. Such cargo conveyor systems typically have a conveyor route on which cargo carriers and/or cargo are transported. For this purpose, the conveyor route runs continuously and takes along cargo carriers or cargo placed on it, in particular by friction. To stop the cargo carriers or the cargo, stoppers are used that retain the conveyed products on the conveyor and release them again for further conveying as required.

Stoppers for cargo conveyor systems typically have a cam for this purpose that can be retracted and extended via a drive. The cam is moved into the transport path of the conveyed products by extending the cam and retains the conveyed products. The conveyed products are released again by retracting the cam.

The retraction and the extension of the cams frequently take place pneumatically. This has the disadvantage that a pneumatic supply has to be provided.

Electromagnetic stoppers are already known in which the cam is extended via a monostable lifting solenoid. The use of a monostable lifting solenoid has the advantage that on a failure of the voltage supply and/or on a defect of the electronics, the cam is automatically extended. It is hereby prevented that cargo are further conveyed in an unwanted manner due to a defective stopper. The use of a monostable lifting solenoid, however, has the disadvantage that high currents are required to hold the cam in the retracted position.

It is the object of the present invention to provide an improved electromagnetic stopper.

This object is achieved by an electromagnetic stopper in accordance with the disclosure.

The present invention comprises an electromagnetic stopper for stopping and/or for separating cargo carriers and/or cargo conveyed on a continuously operated cargo conveyor system, comprising:
- a bistable lifting solenoid having at least one coil and at least one permanent magnet;
- a cam that can be retracted and extended with the aid of the lifting solenoid;
- one or more electrical energy stores, in particular capacitors; and
- a control that discharges the energy store or the energy stores via the at least one coil of the lifting solenoid with the aid of switches such the cam is extended.

An operation of the stopper that is a lot more energy saving becomes possible by the use of a bistable lifting solenoid.

In a possible embodiment of the present invention, the bistable lifting solenoid has two end of stroke positions. A first end of stroke position preferably corresponds to the completely retracted position of the cam; the second end of stroke position to the completely extended position of the cam. In the completely extended position, the cam preferably blocks the conveyor route of the cargo conveyor system; in the completely retracted position, the cam preferably releases the conveyor route.

A spring system is preferably provided that preloads one or more armatures of the bistable lifting solenoid from the end of stroke positions in the direction of a center of stroke position. The spring system increases the force of the lifting solenoid and permits an energy saving operation. The spring system can be installed in the lifting solenoid or can be configured as a further element of the stopper externally to the lifting solenoid.

The potential energy, excluding the electrical energy and in the currentless case, stored in the stopper preferably does not differ from one another in the two end of stroke positions by more than 50% of the greater value, preferably by no more than 25%. The electrical energy is left out of consideration for the calculation of the potential energy and the currentless case is looked at. The potential energy therefore first results from the potential energy stored by the springs and by the permanent magnets. For the case that the cam is moved in a vertical direction, the potential energy of the cam due to gravity is preferably also taken into account in the calculation of the potential energy stored in the stopper.

Provision is made in a possible embodiment that the bistable lifting solenoid has an asymmetrical characteristic. The force and/or the acceleration of the lifting solenoid on an inward travel movement from the completely extended position of the cam can in particular be greater than on an inward travel movement from the completely retracted position.

Provision is made in a further possible embodiment that wherein the magnetic holding force of the lifting solenoid is the highest in that end of stroke position in which the cam of the stopper is in its extended position.

This is preferably achieved by a geometrical characteristic influence. Alternatively or additionally, the magnetic holding force in one of the end of stroke positions can amount to between 20% and 80% of the magnetic holding force in the other end of stroke position, preferably between 30% and 70%.

In a preferred embodiment, the stopper has a resting point in a position in which the cam is partially extended in the currentless case. The cam is preferably extended sufficiently far at the resting point to reliably stop cargo carriers and/or cargo in the conveyor system. Greatly increased safety hereby results.

The resting point can be achieved by an asymmetric characteristic.

The resting point is preferably offset with respect to the center of the stroke distance, with the resting point in particular being arranged between the end of stroke position that corresponds to a completely extended position of the cam and the center of the stroke distance.

The distance between the resting point and the center of the stroke distance preferably amounts to more than 5% of the stroke distance, further preferably more than 10%, further preferably more than 20%. Alternatively or additionally, the distance between the resting point and the end of stroke position that corresponds to a completely extended position of the cam can preferably amount to more than 2% of the stroke distance, further preferably more than 5%, further preferably more than 10%.

The resting point is preferably provided by a resting point of the lifting solenoid, in particular by a third lifting location of the lifting solenoid stable in the currentless state.

Provision is made in a possible embodiment that the control recognizes an interruption and/or a switching off of the voltage supply of the stopper and extends the cam in response thereto, with the drop in the supply voltage preferably being recognized by means of a flank recognition. The stopper can therefore be controlled in exactly the same way as a stopper having a monostable lifting solenoid.

Alternatively or additionally, the control can be configured such that the electrical energy store or stores, preferably capacitors, are charged in response to a switching on of the supply voltage and such that the reaching of a specific threshold voltage at the electrical energy store is recognized by the control, whereupon the latter discharges the electrical energy store or stores via the bistable lifting solenoid such that the cam is retracted.

In a possible embodiment, the bistable lifting solenoid is controlled via a full bridge, in particular a MOSFET full bridge, with the full bridge preferably having two further switches via which the first and second energy stores can be connected in parallel in a first switching state and can be separately discharged in a second switching state.

In a possible embodiment, the control has at least one first energy store and one second energy store, with the first energy store being able to be discharged in series by two coils of the lifting solenoid, and with the second energy store being able to be discharged by only one of the two coils of the lifting solenoid.

In a possible embodiment, the second energy store is selectively able to be discharged via one of the two coils. The discharge can here in particular take place via the first coil or via the second coil in dependence on the direction of movement.

Alternatively or additionally, the second energy store can selectively also be able to be discharged in series via the two coils of the lifting solenoid. The discharge can here in particular take place via one of the two coils or in series via the two coils in dependence on the direction of movement.

The electrical circuit can in particular be designed such that, for a control of a first direction of movement of the lifting solenoid, in particular to extend the cam, both energy stores are discharged in series by two coils of the lifting solenoid and, for a control of a second direction of movement of the lifting solenoid, in particular to retract the cam, the first energy store is discharged in series by the two coils and the second energy store is discharged by only one of the two coils, in particular by the first coil.

Further preferably, the discharge of the second energy store takes place with a time lag to the discharge of the first energy store, with the discharge of the second energy store preferably starting even before the occurrence of the adjustment process.

The lifting solenoid preferably has two coils that are connected in series and preferably have a central tapping.

Furthermore, at least one first energy store and one second energy store can be provided, with both energy stores being discharged by the coils connected in series along a first direction of movement, in particular to extend the cam, while on the reverse direction of movement, in particular to extend the cam, the first energy store is first discharged by the coils connected in series and the second energy store is discharged with a time delay by the central tapping of both coils, with the discharge of the second energy store preferably starting even before the occurrence of the adjustment process.

In a possible embodiment, the control has means for the position detection of the stopper. The control can in particular have a microcontroller that is connected to the means for position detection and/or takes account of the location information acquired by means of the means for position detection in the control of the bistable lifting solenoid.

The cam can furthermore have a damping mechanism and/or be connected to same. The damping mechanism preferably causes the cargo to stop in a damped manner.

In a possible embodiment, the stopper has a spring system having a first spring that exerts a force on the armature or armatures in the direction toward the center of stroke position in a first end of stroke position and having a second spring that externs a force on the armature or armatures in the direction toward the center of stroke position in a second end of stroke position, wherein the armature or armatures is/are held in a permanent magnetic manner against the spring force in both end of stroke positions in the currentless case. The spring system can be integrated in the lifting solenoid or can form a separate part of the stopper. The first and second springs preferably have spring travels of different lengths and/or exert forces of different amounts on the armature or armatures in the respective end of stroke position and/or have spring rates of different amounts.

As described above, the second end of stroke position preferably corresponds to the completely extended position of the cam and the first end of stroke position corresponds to the completely retracted position.

The spring travel of the first spring is preferably greater than the spring travel of the second spring and the second spring exerts a greater force on the armature or armatures in the second end of stroke position than the first spring exerts on the on the armature or armatures in the first end of stroke position.

Alternatively or additionally, the spring travel of the first spring can be greater than the spring travel of the second spring and the spring rate of the second spring in the second end of stroke position can be greater than the spring rate of the first spring in the first end of stroke position.

In a possible embodiment of the present invention, the spring travel of the first spring amounts to between twice and 100 times the spring travel of the second spring, preferably between 4 times and 20 times.

In a further possible embodiment of the present invention, the force the second spring exerts on the armature or armatures in the second end of stroke position amounts to between 1.5 times and 100 times the force the first spring exerts on the armature or armatures in the first end of stroke position, preferably between 3 times and 15 times.

In a further possible embodiment of the present invention, the spring rate of the second spring in the second end of stroke position amounts to between twice and 1000 times the spring rate of the first spring in the first end of stroke position, preferably between 10 times and 500 times, further preferably between 20 times and 100 times.

In a further possible embodiment, at least one of the springs, and preferably the second spring, does not generate any force between the armature and the stator over a part of the stroke travel and/or is not in contact with the armature and/or with the stator over a part of the stroke travel. A retention security is preferably provided in this case that secures the spring in a predetermined position over this part of the stroke travel and in so doing preferably holds it in a preloaded state.

Provision is made in a possible embodiment that the magnetic holding force of the lifting solenoid is smaller in one of the two end of stroke positions than in the other end of stroke position. The magnetic holding force of the lifting solenoid can in particular be at least 20% smaller in one of the two end of stroke positions, further preferably at least 30% smaller, than in the other end of stroke position.

The magnetic holding force in the first end of stroke position is preferably smaller than in the second end of stroke position.

Alternatively or additionally, the magnetic holding force in one of the end of stroke positions can amount to at least 20% of the magnetic holding force in the other end of stroke position, preferably at least 30%.

Provision is made in a possible embodiment that the stator and the armature or armatures have a geometrical characteristic influence in one of the end of stroke positions, and preferably in the first end of stroke position, in particular a working air gap, in particular a conically extending working air gap, not extending in a plane perpendicular to the axis of the lifting solenoid.

The stator and the armature or armatures preferably have a weaker or no geometrical characteristic influence in the other end of stroke position, and preferably in the second end of stroke position.

Provision is made in a possible embodiment that the difference between the amount of the magnetic holding force and the amount of the force that the respective spring applies differs by a maximum of 50% of the larger value in both end of stroke positions.

Some design features of a lifting solenoid such as can be used in the stopper in accordance with the invention will be described in the following. The features can be implemented both singly and in combination.

Provision is made in a possible embodiment that the at least one coil and the at least one permanent magnet are arranged at the stator.

Provision is made in a possible embodiment that the stator forms a housing that surrounds the armature or armatures, with an armature preferably being provided that is arranged in the interior of the stator on a guide rod, with the guide rod preferably being movably supported at the stator. The guide rod is preferably connected to the cam and transmits the force of the lifting solenoid to the cam.

Provision is made in a possible embodiment that the spring system is arranged within the stator, with the first spring preferably being arranged between the first front section and a first side of the armature and the second spring being arranged between a second front section and a second side of the armature, and/or with the first and second springs being configured as coil springs that encompass the guide rod of the armature.

Provision is made in a possible embodiment that the stator has a soft magnetic sleeve and first and second soft magnetic front sections that form a housing in which the armature is displaceably arranged.

In a possible embodiment, at least one first working air gap can be provided between the armature and the first front section and at least one second working air gap can be provided between the armature and the second front section.

At least one permanent magnet and at least one first coil and one second coil are preferably arranged at the stator, with the armature forming a first magnetic part circuit with the sleeve and the first front section in the first end of stroke position, said first magnetic part circuit surrounding at least the first coil, while the working air gap or gaps are opened to a maximum with the second front section, and with the armature forming a second magnetic part circuit with the sleeve and the second front section in the second end of stroke position, said second magnetic part circuit surrounding at least the second coil, while the working air gap or gaps are opened to the maximum with the first front section.

Provision is made in a possible embodiment that the at least one permanent magnet is arranged between the first and second coils in an axial direction and forms a respective part of the first and second magnetic part circuits, with the permanent magnet being arranged such that it overlaps the armature both in the first end of stroke position and in the second end of stroke position in the axial direction and preferably surrounds it, with the permanent magnet preferably being directly magnetically coupled to the armature. Different arrangements of the permanent magnet or permanent magnets are, however, also possible.

Provision is in contrast made in a preferred embodiment that at least one first permanent magnet and one second permanent magnet are provided, wherein the first and second coils are arranged between the first and second permanent magnets in the axial direction, with the first permanent magnet putting the sleeve and the first front section under a magnetic voltage and the second permanent magnet putting the sleeve and the second front section under a magnetic voltage. The construction length can hereby be reduced with respect to other design embodiments.

Provision is made in a possible embodiment that the first magnetic part circuit encompasses the first permanent magnet and the second magnetic part circuit encompasses the second permanent magnet.

Provision is made in a possible embodiment that the armature magnetically short circuits the sleeve and the first front section in the first end of stroke position and that the armature magnetically short circuits the sleeve and the second front section in the second end of stroke position.

Provision is made in a possible embodiment that the sleeve has a magnetic circuit section between the two coils that overlaps the armature in both the first end of stroke position and in the second end of stroke position in the axial direction and that preferably surrounds it, with the magnetic circuit section preferably magnetically directly coupling at the armature.

Provision is made in a possible embodiment that the first and second coils are arranged at least partly between the sleeve and the movement range of the armature and/or in an inner groove and/or cutout of the sleeve.

Provision is further preferably made that the first and/or the second front sections have a fastening region that extends over the first or second permanent magnet in the radial direction and is fastened to the sleeve. The assembly is hereby substantially simplified. The fastening region is preferably magnetically saturated by the first or second permanent magnet.

In a possible embodiment, the fastening region is of board-shape, in particular of an annular board shape, and/or has cutouts. In a possible embodiment, the fastening region has less material toward the outside and in particular becomes thinner.

In a second independent aspect, the present invention comprises a control for a stopper such as was described above in the context of the stopper. The control in particular has switches via which energy stores can be discharged by at least one coil of the lifting solenoid such that the cam is extended. The control is preferably designed here as has already been described above.

In a possible embodiment, the control in particular has at least one first energy store and one second energy store, with the first energy store being able to be discharged in series by two coils of the lifting solenoid, and with the second energy store being able to be discharged by only one of the two coils of the lifting solenoid.

In a possible embodiment, the second energy store is selectively able to be discharged by one of the two coils. The discharge can here in particular take place via the first coil or via the second coil in dependence on the direction of movement.

Alternatively or additionally, the second energy store can selectively also be able to be discharged via the two coils of the lifting solenoid. The discharge can here in particular take place via one of the two coils or in series via the two coils in dependence on the direction of movement.

The electrical circuit can in particular be designed such that, for a control of a first direction of movement of the lifting solenoid, in particular to extend the cam, both energy stores are discharged in series via two coils of the lifting solenoid and, for a control of a second direction of movement of the lifting solenoid, in particular to retract the cam, the first energy store is discharged in series via the two coils and the second energy store is discharged via only one of the two coils, in particular via the first coil.

Further preferably, the discharge of the second energy store takes place with a time lag to the discharge of the first energy store, with the discharge of the second energy store preferably starting even before the occurrence of the adjustment process.

The present invention furthermore comprises a cargo conveyor system having a continuously operated cargo conveyor route for conveying cargo and/or cargo carriers, having one or more stoppers such as were described above for stopping and/or separating the cargo and/or the cargo carriers.

BRIEF DESCRIPTION OF THE FIGURES

The present invention will now be described in more detail with reference to embodiments and drawings.

DETAILED DESCRIPTION

There are shown.

Figure 1A:
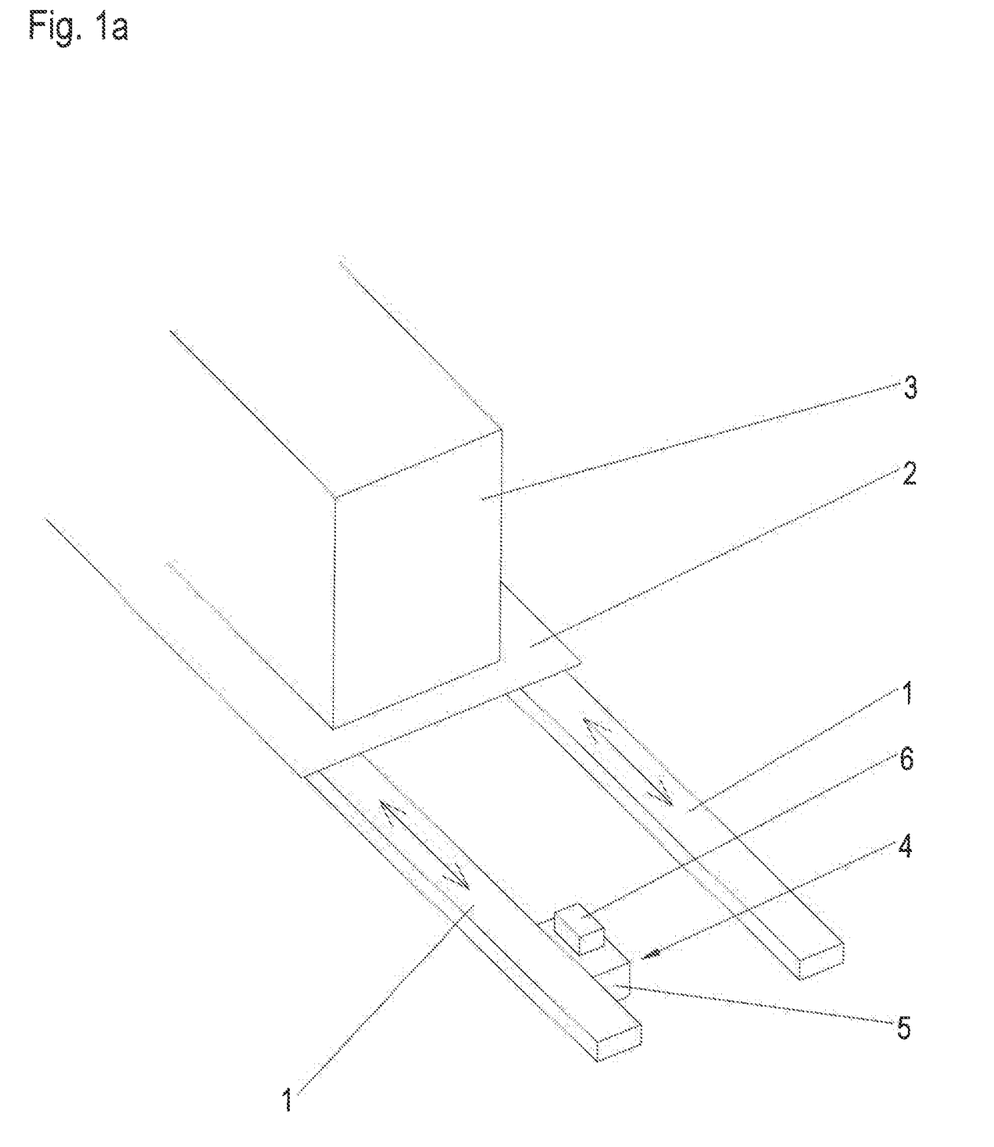
FIG. 1a: an embodiment of a cargo conveyor system in accordance with the present invention.

An embodiment of a continuously operated cargo conveyor system in accordance with the invention is schematically shown in FIG. 1a. It has a conveyor route 1, in particular a conveyor belt, that is continuously moved by a drive, not shown. Cargo carriers 2 on which cargo 3 are arranged are disposed on said conveyor route 1 with frictional engagement. The cargo carriers are taken along by the conveyor belt and thus conveyed due to the friction between the cargo carriers 2 and the conveyor route 1.

The stopper 4 in accordance with the invention is used to stop and/or to separate the cargo carriers 2 or the cargo 3. It has a cam 6 for this purpose that can be retracted and extended and that can hereby be traveled into the travel path of the cargo carriers and can be removed from this travel path.

In the completely extended position, the cam 6 is in the travel path of the cargo carrier and therefore stops it. The cam can be removed from the travel path by retracting it and hereby releases the cargo carrier. The cam can furthermore have a damping mechanism or can be arranged at the stopper housing 5 via same. The damper is preferably configured such that it causes the movement of a cargo carrier 2 to stop in a damped manner.

The cam 6 is movably arranged at the housing 5 of the electromagnetic stopper and can be retracted and extended in accordance with the invention with the aid of a bistable lifting solenoid.

Figure 1B:
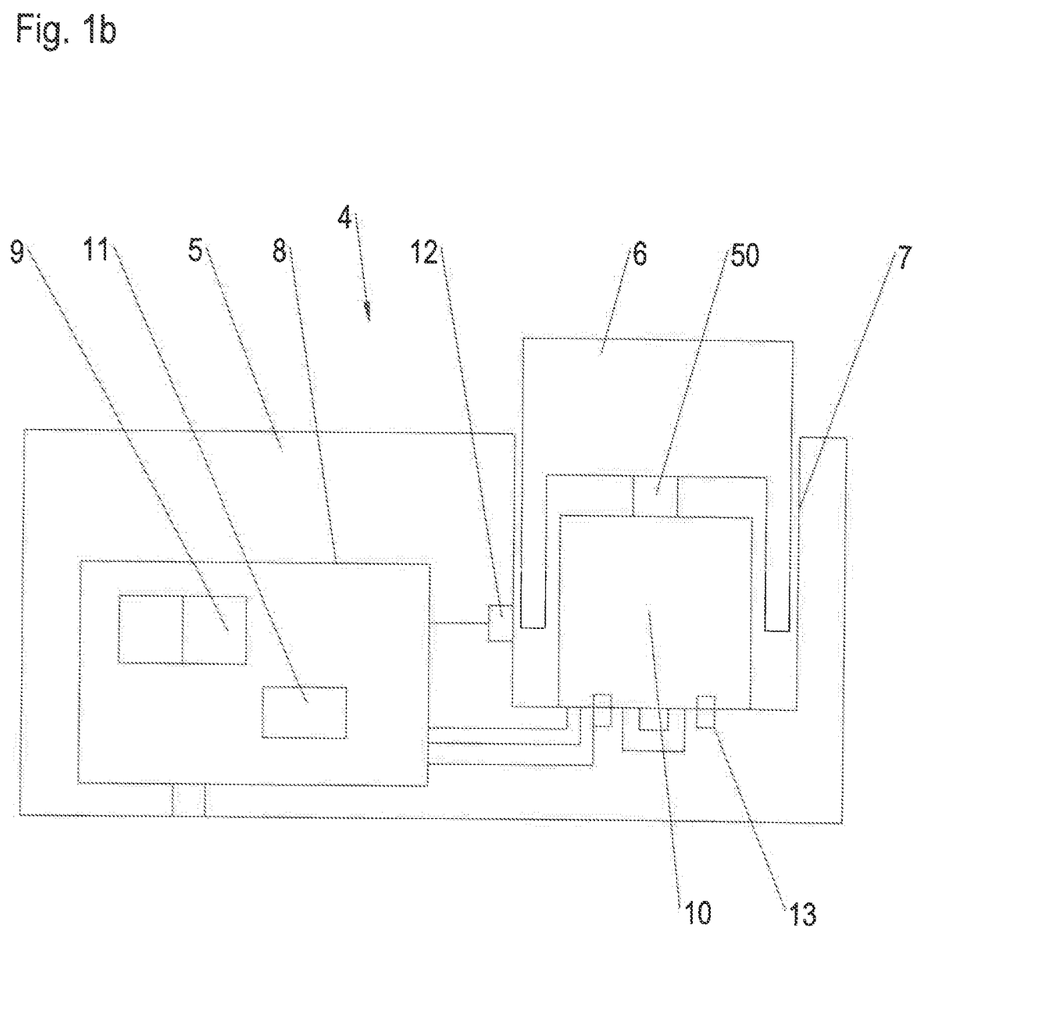
FIG. 1b: an embodiment of an electromagnetic stopper in accordance with the invention.

An embodiment of the electromagnetic stopper is shown in FIG. 1b. It has a housing 5 having a guide 7 at which the cam 6 is displaceably supported. The lifting solenoid 10 is provided to retract and extend the cam 6. The housing of the lifting solenoid 10 is fastened to the housing 5 of the stopper via screws 13. An axle 50 of the lifting solenoid 10 is connected to the cam 6 to retract and extend it.

A control 8 to control the lifting solenoid 10 is furthermore provided in the housing 5. Said control 8 has one or more electrical energy stores 9, capacitors in the embodiment. Switches 11, semiconductor switches in the embodiment, are furthermore provided that can discharge the energy store or stores 9 via at least one coil of the lifting solenoid such that the cam is extended.

The control preferably recognizes an interruption and/or a switching off of the voltage supply of the stopper and extends the cam in response thereto, with the drop in the supply voltage preferably being recognized by means of a flank recognition. The control can furthermore be configured such that the electrical energy store or stores are charged in response to a switching on of the supply voltage and such that the reaching of a specific threshold voltage at the electrical energy store is recognized by the control, whereupon the latter discharges the electrical energy store or stores via the bistable lifting solenoid such that the cam is retracted.

The lifting solenoid has at least one permanent magnet in addition to the at least one coil and is bistable. The lifting solenoid is in particular held in a permanent magnetic manner both in a first end of stroke position that corresponds to a completely retracted cam and in a second end of stroke position in which the cam is completely extended as long as the coils of the lifting solenoid remain currentless. The lifting solenoid preferably has a spring system that preloads the lifting solenoid in the direction toward a center of stroke position in the end of stroke positions.

In the embodiment, a sensor 12 is furthermore provided that detects the position of the cam 6. The data of the sensor 12 can be evaluated via the control 8.

In the embodiment in FIG. 1b, the cam 6 is guided in a cutout 7 of the housing 5. The cam 6 could, however, in alternative embodiments, also be movably arranged at the housing 4 in different manners and can, for example, be movably arranged and/or guided at a side wall of the housing.

A retraction in the sense of the present invention in particular does not require the cam to be retracted in a cutout of the housing. A retraction is rather already present when the cam can be traveled from the extended position back into a position in which it releases the conveying path.

In the embodiment, the stopper has a resting point in a position in which the cam is partially extended in the currentless case. This is in particular achieved via a further stable stroke position of the lifting solenoid that is disposed between the first and second end of stroke positions. The cam is preferably extended sufficiently far at the resting point to reliable stop cargo carriers and/or cargo in the conveyor system. The cam can in particular be extended beyond its center position and can preferably be extended to at least 70% of its stroke distance.

The direction of movement of the cam is preferably not perpendicular to the direction of movement of the conveyor route, but is rather inclined with respect to the direction of movement of the conveyor route. The lifting solenoid used in accordance with the invention can here be retracted so fast that it is no longer in contact with the workpiece carrier or with the workpiece after the first time release therefrom due to the inclined direction of movement of the cam since the speed of the cam in the direction of movement of the conveyor route is greater than the speed of the conveyor route.

One embodiment of a bistable lifting solenoid such as can be used within the framework of the present invention and two embodiments of controls for controlling a lifting solenoid used in accordance with the invention will be shown in more detail in the following with reference to FIGS. 2 to 4.

Figure 2:
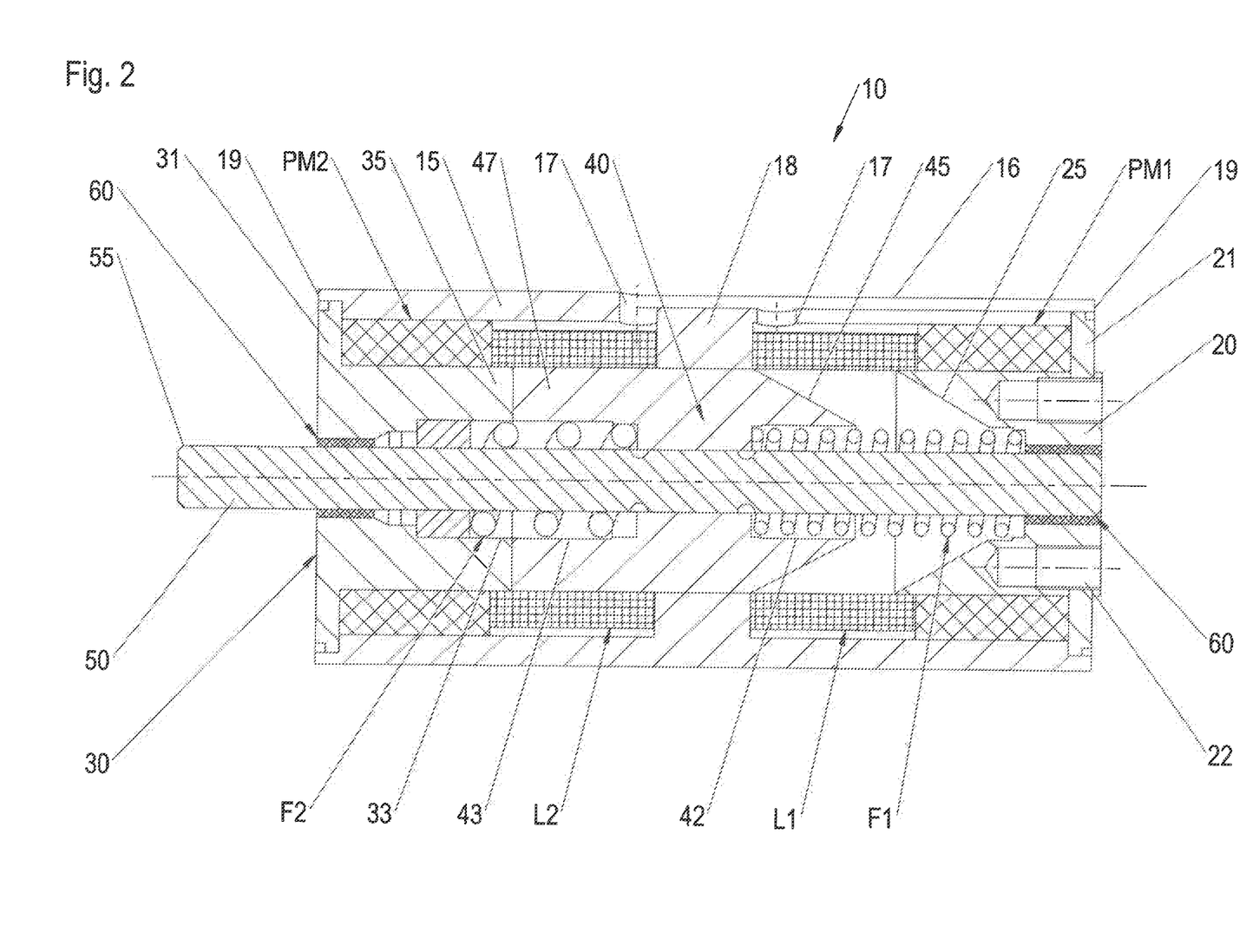
FIG. 2: an embodiment of the lifting solenoid used in accordance with the invention in a sectional view.

FIG. 2 shows an embodiment of a bistable lifting solenoid in which a plurality of aspects of the present invention are implemented in combination. The features in accordance with the individual aspects described in combination with reference to the embodiment can, however, also each be used per se in accordance with the invention.

The bistable lifting solenoid in accordance with the present invention has a stator and an armature 40 axially displaceable with respect to the stator. The stator and the armature consist of a soft magnetic material.

In the embodiment, the stator comprises one soft magnetic sleeve 15 and two soft magnetic front sections 20 and 30 that form a housing in which the armature 40 is displaceably arranged. The front sections in the embodiment each have a region that is arranged in the sleeve 15, in particular a substantially cylindrical region.

In the embodiment, the armature 40 is supported by an axle 50 that is axially displaceable supported via bearings 60 at the front sections 20 and 30 of the stator. The axle 50 is accordingly moved by a movement of the armature 40. In the embodiment, the axle 50 has a second side having a connection region 55 by which it is connected to the cam. The working air gaps of the lifting solenoid are located between the armature 40 and the front sections 20 and 30.

In the second end of stroke position, the second side of the axle 50 having the connection region 55 is fully extended so that the cam is also fully extended. In the first end of stroke position, the second side of the axle 50 having the connection region 55 to the cam is completely retracted and in turn the axle on the oppositely disposed first side is completely extended. The cam is completely retracted in the first end of stroke position.

The lifting solenoid in the embodiment has bores 22, in particular threaded bores, through which it is mounted to the housing of the stopper.

Alternative design configurations of the stator, of the armature, and of the axle are likewise conceivable within the framework of the present invention.

The internal design of the lifting solenoid is shown in the sectional view in FIG. 2. The bistable lifting solenoid has a spring system having a first spring F1 that exerts a force on the armature 40 in the direction toward the center of stroke position in a first end of stroke position and a second spring F2 that in the second end of stroke position shown in FIG. 2 exerts a force on the armature 40 in the direction toward the center of stroke position.

In the embodiment, the two springs are each arranged within the housing formed by the stator between one of the front sections 20 or 30 and the armature 40. In the embodiment, they are coil springs that surround the axle 50. Annular grooves 42 and 43 that take up at least a part of the respective spring in the respective end positions are provided in the armature 40. Corresponding annular grooves can also be provided in the front sections 20 and 30.

At least one permanent magnet PM1 and PM2 is furthermore provided that holds the armature 40 against the force of the respective spring in the respective end of stroke position in the currentless state of the coils. In the embodiment, two permanent magnets PM1 and PM2 are provided that are associated with the respective end of stroke positions. Instead of two permanent magnets, only one single permanent magnet could also be used.

Two coils L1 and L2 are furthermore provided and on an application of current to them, the armature can be traveled from one end of stroke position into the other end of stroke position. In the embodiment, two coils L1 and L2 are provided whose windings in the region 17 are respectively separately led out of the housing. Alternatively, the coils could also be connected in series within the housing and can preferably have a central tapping.

In accordance with the first aspect of the present invention, differing springs F1 and F2 are used. In the embodiment, the first and second springs, on the one hand, have spring travels of different lengths. The spring travel of the first spring F1 is in particular greater than the spring travel of the second spring F2. The two springs furthermore exert forces of different amounts on the armature in the respective end of stroke position. The first spring F1 in particular exerts a smaller force on the armature 40 in the first end of stroke position in which the armature 40 is in abutment with the first front section 20 than the second spring F2 does in the second end of stroke position shown in FIG. 2 in which the armature 40 is in abutment with the second front section 30. The first spring F1 in the embodiment furthermore has a smaller spring rate than the second spring F2.

Due to the smaller spring travel, the second spring furthermore only exerts a force on the armature 40 over a part of the stroke distance. A retention security, not drawn in FIG. 2, is preferably provided that secures the second spring F2 in a predefined position over the part of the stroke distance in which it does not generate any force between the armature and the stator and holds it in a preloaded state. This increases the service life of the lifting solenoid.

In the specific embodiment, the lifting solenoid has a travel distance of 15 mm. The first spring has a spring travel that corresponds to the stroke distance. The second spring F2 in contrast only has a spring travel of 2 mm. The first spring exerts a force of approximately 50 N on the armature in the first end of stroke position and has a spring rate of approximately 3.5 N/mm. The second spring exerts a force of approximately 350 N on the armature in the second end of stroke position and has a spring rate of approximately 170 N/mm. Both springs are preloaded on reaching their maximum spring travels.

A number of advantages can be achieved by the different springs F1 and F2 in the embodiment. The strong spring F2 provides a high acceleration of the armature on a movement from the second end of stroke position in the direction toward the center of stroke position. The first spring F1 having the long spring travel in contrast permits a correspondingly long embodiment of the stroke distance.

In accordance with a further aspect of the present invention, the lifting solenoid has an asymmetrically arranged resting point in the currentless case. This resting point represents a third stable stroke position of the bistable lifting solenoid in the currentless case that is arranged between the first and second end of stroke positions. This resting point in which the opposite forces exerted on the armature 40 by the springs and permanent magnets is asymmetrical, i.e. is arranged offset with respect to the center of the stroke distance.

This has the advantage that the lifting solenoid can be brought into a largely extended or retracted position with only very little energy in that it is traveled into the resting point from the end of stroke position that is further remote from the resting point. Such an asymmetrical resting point that can be traveled to with only little energy use represents an important securing function in a number of applications.

In the embodiment, the asymmetrical resting point is mainly achieved by the different springs in accordance with the first aspect of the present invention, in particular by the spring travels of different lengths and/or the forces of different amounts and/or by the spring rates of different amounts of the first and second springs. The resting point is in particular arranged closer to the second end of stroke position than to the first end of stroke position since the second spring has a smaller spring travel than the first spring. Since the second spring has a much larger spring rate than the first spring, the resting point is predominantly determined by the length of the spring travel of the second spring and is therefore approximately 2 mm remote from the second end of stroke position in the embodiment. In the embodiment, the magnetic forces acting on the armature only exercise a subordinate role on the exact position of the resting point.

The resting point can be reached from the first end of stroke position with only little energy expenditure since the (high) returning force of the second spring F2 does not have to be overcome for this purpose. The drive is nevertheless already largely extended on reaching the resting point.

In accordance with a further aspect of the present invention, the lifting solenoid is configured such that the permanent magnetic holding force, often also called an "adhering force", is of different amounts in the first and second end of stroke positions. The lifting solenoid is in particular configured here such that the permanent magnetic holding force is smaller in the first end of stroke position than in the second end of stroke position. In the embodiment, a geometrical characteristic influence is provided between the first front side 45 of the armature that faces the first front section 20 and the inner side 25 of the first front section 20. The first working air gap that is closed in the first end of stroke position is located between these two surfaces 25 and 45. The geometrical characteristic influence means that the surfaces 25 and 45 do not extend in a plane perpendicular to the axial direction of movement of the lifting solenoid, but rather have a profile with respect to such a plane. In the embodiment, the surfaces have a conical profile that has an angle in the embodiment such that the permanent magnetic holding force is reduced by approximately 50%.

No geometrical characteristic influence is in contrast provided on the oppositely disposed side on which the second front side 47 of the armature 40 and the inner side 35 of the second front section 30 are oppositely disposed over a second working air gap. Here, the two surfaces between which the working air gap is located extend in a plane perpendicular to the axial direction of movement of the lifting solenoid.

The permanent magnetic holding forces of different amounts in the first and second end of stroke positions are preferably selected such that the respective difference between the permanent magnetic holding force and the respective opposite spring force is substantially equal in the two end of stroke positions and/or is preferably at least in the same order of magnitude while taking account of the external forces acting on the lifting solenoid. This difference respectively secures the lifting solenoid in the two end of stroke positions against an unwanted release, for example due to vibrations. In the embodiment, the magnetic holding force in the first end of stroke position amounts to approximately 225 N; in the second end of stroke position to approximately 450 N.

In accordance with a further aspect of the present invention, the bistable lifting solenoid is adapted such that the value of the respective potential energy stored in the lifting solenoid in the two end of stroke positions does not differ by more than 50% of the greater value from one another, i.e. such that the smaller of the two values amounts to at least 50% of the greater value. The potential energy in the two end of stroke positions is preferably here substantially the same. The electrical energy is left out of consideration for the calculation of the potential energy and the currentless case is looked at. In the simplest case, the potential energy therefore results from the potential energy stored by the springs and the permanent magnets.

External forces that act on the bistable lifting solenoid within the framework of its specific use are particularly preferably also taken into account with the framework of the determination of the potential energy. This can, for example, be the force of gravity if the lifting solenoid lifts an element against the force of gravity. Alternatively or additionally, it can be a case of external spring forces, for example when the lifting solenoid is used to move a spring-loaded element.

A particularly energy saving operation of the lifting solenoid results from the similar amount of potential energy in the two end of stroke positions. In the embodiment, the similar amount of potential energy is in particular achieved in that the spring having the greater force and/or spring rate has the smaller spring travel.

In the embodiment of the bistable lifting solenoid shown in FIG. 2, a second aspect of the present invention is implemented that is independent of the above aspects and in particular independent of the different embodiment of the springs, and indeed through the design embodiment of the stator and of the armature, and through the arrangement of the permanent magnets and of the coils.

The stator in the embodiment is formed by a soft magnetic sleeve 15 and by the two front sections 20 and 30 that together form a housing in whose interior the soft magnetic armature 40 is displaceably arranged. The sleeve 15 extends between the first front section 20 and the second front section 30 over the total length of the lifting solenoid. A first working air gap is formed between the first side of the armature 40 and the first front distance 20 and a second working air gap is formed between the second side of the armature 40 and the second front section 30.

In accordance with the second aspect, two permanent magnets PM1 and PM2 are provided that hold the armature 40 in the respective end of stroke positions against the force of the spring system. The two permanent magnets PM1 and PM2 are each arranged between the magnetic sleeve 15 and the respective front section 20 and 30 respectively such that they put them under a magnetic voltage. For this purpose, PM1 and PM2 can, for example, be formed from a respective one or more radially polarized hard magnetic rings, preferably NdFeB. Alternatively, PM1 and PM2 can be formed from radially or diametrically polarized hard magnetic ring segments. The armature 40 in the respective end of stroke position magnetically short circuits the sleeve 15 with the respective front section 20 or 30 respectively via the magnetic circuit section 18 that acts as a back iron so that the respective permanent magnet exerts a holding force on the armature 40 in the respective end of stroke position. The two end of stroke positions have respective coils L1 and L2 associated with them on an application of current to which the armature is released from the respective end of stroke position or, with a reverse current direction, can be pulled into its end of stroke position against the force of the respective spring.

The magnetic part circuit formed in the first or second end of stroke positions by the sleeve, the armature, the respective front section, and respective permanent magnets surrounds the respective coils L1 and L2 such that a current application to the coil in one current direction acts against the magnetic holding force of the respective permanent magnet and thus provides a deflection of the armature from the respective end of stroke position. Once the holding force of the permanent magnet has been overcome, the respective spring substantially contributes to the movement of the armature.

The coils L1 and L2 are arranged in the axial direction of the lifting solenoid between the two permanent magnets PM1 and PM2. The sleeve 15 has a middle magnetic circuit section 18 that is arranged between the two coils L1 and L2 such that it magnetically couples to the armature 40 both in the first end of stroke position and in the second end of stroke position. In the axial direction, the respective coils L1 and L2 adjoin this magnetic circuit section 18 of the sleeve 15 at both sides and the respective permanent magnets PM1 and PM2 are then arranged further outwardly in the axial direction next to said coils L1 and L2 respectively. The magnetic circuit section 18 in the embodiment is formed by an inwardly projecting elevated portion of the inner wall of the sleeve 15, while the coils L1 and L2 or the permanent magnets F1 and F2 are arranged in grooves or cutouts at the inner periphery of the sleeve 15.

In the embodiment, the permanent magnets PM1 and PM2 are each arranged between the sleeve 15 and a part of the respective front section 20 or 30 respectively projecting into the sleeve. The coils L1 and L2 are in contrast at least partly arranged next to the movement region of the armature 40.

The construction length of the lifting solenoid can be reduced over other construction designs by the use of the axially outwardly arranged permanent magnets PM1 and PM2.

In the embodiment, the lifting solenoid is configured rotationally symmetrically about the axle 50.

In accordance with a further aspect of the present invention, the soft magnetic front sections 20 and 30 of the stator each have a fastening region 21 or 31 respectively by which they are connected to the sleeve 15. This has substantial advantages from a construction aspect since a simple and stable connection is hereby made possible between the front sections and the sleeve in the connection region 19.

Since the fastening region 21 or 31 respectively, however, extends in the radial direction over the first or second permanent magnets PM1 or PM2 respectively, it establishes an actually unwanted short circuit between the sleeve and the respective front section. The fastening region is therefore preferably configured such that it is magnetically completely saturated by the respective permanent magnet. The magnetic flux that flows from the sleeve over the fastening section preferably amounts to a maximum of 50% of the magnetic flux that flows in the respective end of stroke position from the sleeve over the armature to the respective front section, preferably a maximum of 20%.

The fastening region 21 or 31 respectively is board-shaped, in particular ring board-shaped. The fastening region can furthermore have cutouts to reduce the soft magnetic material in the region of the fastening region. In a possible embodiment, the fastening region 31 can have less material toward the outside, for example in that it is thinner toward the outside to thus effect a saturation that is as uniform as possible in this region.

The first and second aspects are implemented in combination in the embodiment, i.e. the lifting solenoid has a design setup in accordance with the second aspect and different springs in accordance with the first aspect. The other above-described aspects are also implemented in combination.

Every single one of the above-described aspects of a lifting solenoid in accordance with the present invention can, however, also be implemented independently of the other aspects. The features described with respect to the individual aspects therefore form the present invention in each case also independently of the features described with respect to other aspects. Only some of the aspects can furthermore also be combined with one another, with the present invention comprising all the combinations of the above-described aspects.

The design setup in accordance with the second aspect can in particular also be used with identical springs and/or with identical magnetic holding forces.

The embodiment with different springs and/or different magnetic holding forces and/or with an asymmetrical resting point can furthermore also be used in a different design embodiment of the holding magnet.

For example, instead of the two outwardly disposed permanent magnets PM1 and PM2, a single permanent magnet can be used that is arranged in the region of the magnetic circuit section 18 and that puts the sleeve 15 and the armature 40 under a magnetic voltage in both end of stroke positions.

Different design embodiments of the stator are furthermore also conceivable, for example with two separate soft magnetic sections between which at least parts of the armature are arranged, for example in the form of an armature plate. Further alternatively or additionally, embodiments are also conceivable having outwardly disposed armature plates and/or having permanent magnets arranged at the armature.

Figure 3:
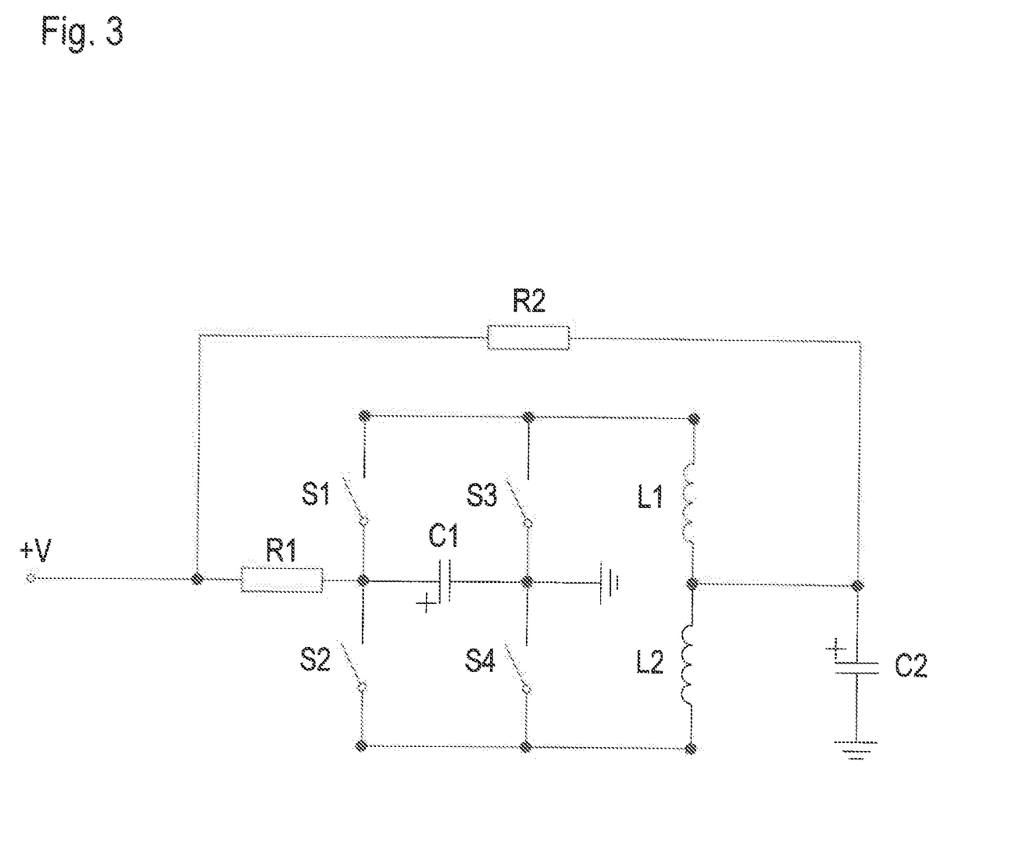
FIG. 3: a first embodiment of a control for controlling the bistable lifting solenoid used in accordance with the invention.
Figure 4:
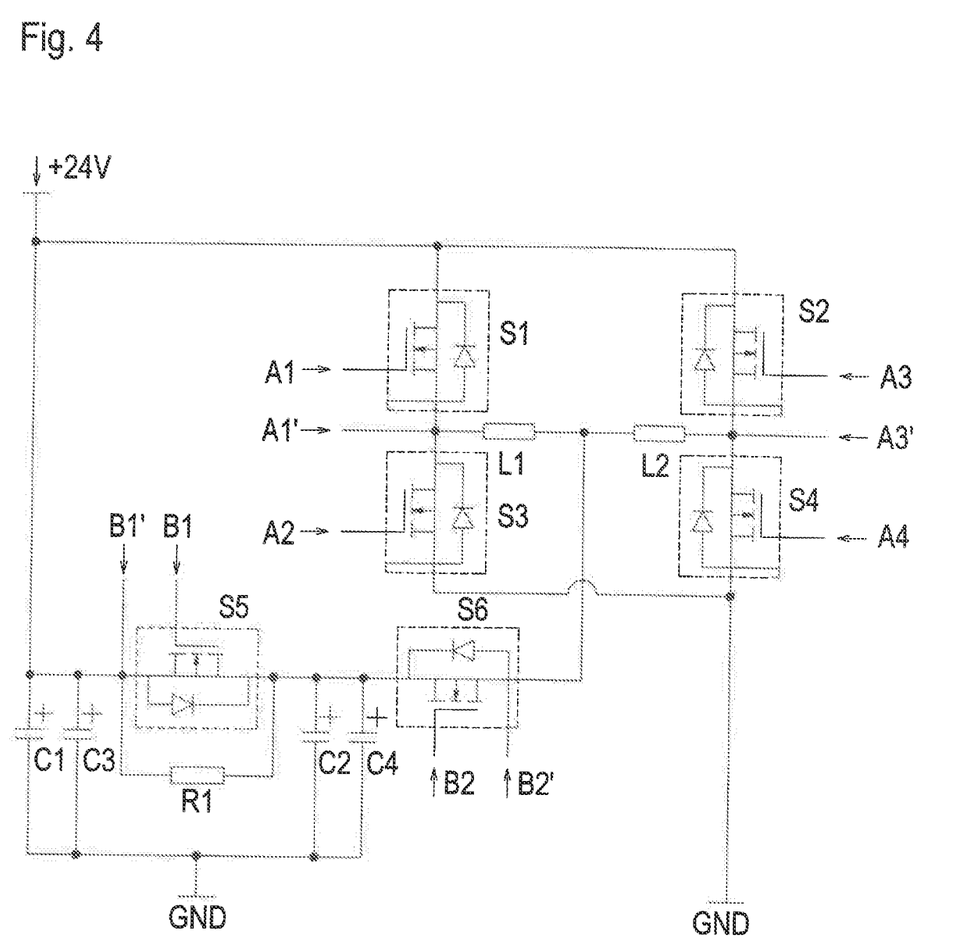
FIG. 4: a second embodiment of a control for controlling the bistable lifting solenoid used in accordance with the invention.

Possible embodiments of a control to control a bistable lifting solenoid within the framework of the present invention are shown in FIGS. 3 and 4. They can thus be used to control bistable lifting solenoids of any desired kind that have at least two coils L1 and L2. The control is particularly preferably used with bistable lifting solenoids in which the armature is permanently magnetically held in the first and second stroke positions in the currentless case, with the lifting solenoid being released from the first end of stroke position on an application of current to the first coil L1 and/or to the second coil L2 with a first current direction and being released from the second end of stroke position on an application of current to the second coil L2 and/or to the first coil L1 with a second current direction.

The lifting solenoid particularly preferably has a spring system having a first spring and a second spring, wherein the first spring exerts a force on the armature in the direction toward the center of stroke position in the first end of stroke position, and wherein the second spring exerts a force on the armature in the direction toward the center of stroke position in the second end of stroke position. The lifting solenoid can be pulled against the spring force of the first spring into the first end of stroke position by application of current to at least the first coil L1 with a second current direction and the armature can be pulled into the second end of stroke position by application of current to at least the second coil L2 with a second current direction.

The stator and the armature can form a part magnetic circuit in the respective end of stroke position, which magnetic part circuit surrounds the respective coil L1 or L2 respectively such that an application of current to the respective coil with the first current direction weakens the permanent magnetic holding force.

The controls can particularly preferably be used to control a lifting solenoid in accordance with the invention such as was described above and particularly preferably to control a lifting solenoid in which one or more of the above-described aspects are implemented. The above-described lifting solenoids in accordance with the present invention further preferably work such as has just been described.

It is common to both embodiments of the control that the application of current to the coils L1 and L2 takes place via one or more energy stores C1, C2 that are discharged via switches S1 to S4 by the coils L1 and L2. The energy stores are capacitors, in particular electrolytic capacitors, in the embodiment. For this purpose, a full bridge formed by the switches S1 to S4 is used in the embodiment to be able to freely select the direction in which the discharge by the coils takes place.

It is further common to both embodiments that at least one first energy store C1 can be discharged by coils L1 and L2 connected in series. At least one second energy store C2 can in contrast be discharged by only one of the two coils L1 or L2. For this purpose, the second energy store C2 can be connected to the central tapping between the two coils L1 and L2. By which of the two coils L1 or L2 the respective discharge takes place is determined by the full bridge that is used both to control the discharge direction of the first energy store C1 and to control the discharge of the second energy store C2 by the first coil L1 or by the second coil L2.

In the embodiment shown in FIG. 3, the energy store C2 is in constant contact with the central tapping between the two coils. If the discharge is therefore released by the full bridge, the first energy store is discharged in series by the two coils L1 and L2 and the second energy store C2 is simultaneously discharged by one of the two coils L1 or L2.

In the embodiment shown in FIG. 4, the second energy store C2 is in contrast connected in a switchable manner to the central tapping between the two coils L1 and L2, and indeed via the switch S6. The second energy store C2 can in contrast be connected in parallel to the first energy store C1 via a further switch S5.

The circuit in FIG. 4 can discharge both energy stores C1 and C2 in series via the two coils L1 and L2 in a first operating mode. In a second operating mode, in contrast, only the first energy store is discharged in series via the coils L1 and L2 and the second energy store C2 is in contrast discharged via one of the two coils L1 or L2. In the second operating mode, the second energy store C2 is preferably connected to the full bridge with a time delay, i.e. the second energy store C2 is only connected to the central tapping between the two coils after the full bridge has already established a connection between the first energy store and the two coils and the circuit for the discharge of C1 has closed. The second energy store C2 is, however, preferably connected at so early a time that the adjustment movement has not yet started.

The discharge of the second energy store C2 by the central tapping has the result that it is only discharged by one of the two coils L1 or L2. On the one hand, more energy is hereby available for this coil. It results as a further advantage that the current through the other coil is limited and an overcompensation is hereby avoided.

The circuit is preferably configured such that the first operating mode is used to move the lifting solenoid in a first direction and the second operating mode is used to move the lifting solenoid in a second direction. The first operating mode, in which the two energy stores C1 and C2 are connected in parallel and both are discharged by the coils L1 and L2 connected in series, can in particular be used for a movement from the first end of stroke position into the second end of stroke position, i.e. to extend the cam. In contrast, the second operating mode in which the second energy store C2 is discharged in parallel with the energy store C1 by one of the two coils L1 and L2, preferably with a time delay with respect to the discharge of the first energy store C1 is preferably used for a movement from the second end of stroke position into the first end of stroke position, i.e. to retract the cam. Such a different control of the two directions of movement is in particular of advantage when the lifting solenoid has an asymmetrical characteristic and/or different springs.

The switches of the full bridge and the switches for switching over between the first and the second operating modes are preferably each configured as semiconductor switches, in particular in the form of a MOSFET.

This is shown in FIG. 4. For the control, respective control inputs A1 to A4 and B1 and B2 are provided via which a voltage difference with respect to the reference connectors A1', A3', B1', and B2' is applied to control the respective switch.

A respective two first energy stores C1 and C3 and two second energy stores C2 and C4 are furthermore connected in parallel in the embodiment in FIG. 4.

In the embodiment shown in FIG. 3, the charging of the energy stores C1 and C2 takes place via resistors R1 and R2 by which they are connected to a voltage supply +V. If the voltage supply is therefore switched on, the energy stores charge via the respective resistors.

However, an electronically regulated charge of the energy stores, in particular with a constant charging current, is preferably carried out both in the first embodiment and in the second embodiment.

Alternatively or additionally, the charge current by which the energy stores are charged can be adjustable. The control can, for example, have a plurality of operating modes that differ by the amount of the charge current, with the control preferably being switchable between the operating modes. The required dead time between two adjustment processes is substantially determined by the charge current. At a high charge current, the time required between two adjustment processes is shortened. A low charge current in contrast extends this time. Due to the different operating modes, the lifting solenoid can, for example when longer times between two adjustment processes are permitted, be operated with an energy supply having a smaller power without overloading it.

Different charge currents can, for example, be implemented by different resistors or by a corresponding electronic control, preferably by switch regulators, for example step-up converters or step-down converters.

The lifting solenoid in accordance with a further aspect of the present invention is also controlled independently of the specific embodiment of the control such as was described above such that, on a switching off of the voltage supply, the lifting solenoid is moved from the first end of stroke position into the second end of stroke position. On a connection of the supply voltage, the lifting solenoid is in contrast moved back from the second end of stroke position into the first end of stroke position.

A monitoring of the supply voltage is preferably carried out. A drop of the supply voltage can, for example, be recognized by means of a flank recognition. If the supply voltage drops, the energy stores are discharged by the coil or coils of the lifting solenoid to move the lifting solenoid from the first end of stroke position into the second end of stroke position.

The electrical energy stores are preferably first charged after the switching on of the supply voltage, with the control recognizing the reaching of a specific threshold voltage at the energy store and thereupon discharging the energy store by the coil or coils of the lifting solenoid so that the latter moves from the second end of stroke position into the first end of stroke position.

Such an embodiment has the advantage that the lifting solenoid in accordance with the invention can be used without problem for a replacement of monostable lifting solenoids and/or monostable pneumatic valves and/or monostable pneumatic drives.

If, as described above, the lifting solenoid has a resting point offset with respect to the center of stroke position, such an operation becomes particularly reliable. For even when the supply voltage fails in an unwanted manner directly after a switching process by which the lifting solenoid was traveled into the first end of stroke position or when other problems with the energy stores occur, a traveling into the resting point is still possible since only very little energy is required for this purpose. However, the lifting solenoid has already largely traveled toward the second end of stroke position at this resting point.

The safety in the use of a bistable lifting solenoid to retract and extend the cam is hereby substantially increased.

The invention claimed is:

1. An electromagnetic stopper for stopping and/or for separating cargo carriers and/or cargo conveyed on a continuously operated cargo conveyor system, comprising:
a bistable lifting solenoid having at least one coil and at least one permanent magnet;
a cam that is retractable and extendable with aid of the lifting solenoid;
one or more electrical energy stores; and
a control that discharges the energy store or the energy stores via the at least one coil of the lifting solenoid with aid of switches such that the cam is extended, wherein the bistable lifting solenoid has two end of stroke positions, with a spring system being provided that preloads one or more armatures of the bistable lifting solenoid out of the end of stroke positions in a direction of a center of stroke position.

2. The stopper in accordance with claim 1, wherein potential energy, excluding electrical energy and in a currentless case, stored in the stopper in the two end of stroke positions does not differ by more than 50% of the greater value.

3. The stopper in accordance with claim 2, wherein the stopper has a resting point in one position in the currentless case in which the cam is partly extended, with the cam being extended sufficiently far at the resting point to reliably stop cargo carriers and/or cargo in the conveyor system; and/or wherein the resting point is reached by an asymmetrical characteristic; and/or wherein the resting point is offset with respect to the center of the stroke distance, with the resting point further being arranged between the end of stroke position that corresponds to a completely extended position of the cam and the center of the stroke distance; and/or wherein the distance between the resting point and the center of the stroke distance further amounts to more than 5% of the stroke distance; and/or wherein the distance between the resting point and the end of stroke position that corresponds to a completely extended position of the cam amounts to more than 2% of the stroke distance.

4. The stopper in accordance with claim 3, wherein the distance between the resting point and the center of the stroke distance amounts to more than 20% of the stroke distance; and/or wherein the distance between the resting point and the end of stroke position that corresponds to a completely extended position of the cam amounts to more than 10% of the stroke distance.

5. The stopper in accordance with claim 2, comprising a spring system having a first spring that exerts a force on the armature or armatures of the lifting solenoid in the direction of the center of stroke position in a first end of stroke position and having a second spring that exerts a force on the armature or armatures in the direction of the center of stroke position in a second end of stroke position, wherein the armature or armatures are held in a permanent magnetic manner against the spring force in both end of stroke positions in the currentless case, with the first and second spring having spring travels of different lengths and/or exerting forces of different amounts on the armature or armatures in the respective end of stroke position and/or having spring rates of different amounts;
wherein the second end of stroke position corresponds to a completely extended position of the cam and the first end of stroke position corresponds to a completely retracted position,
wherein the spring travel of the first spring is greater than the spring travel of the second spring and the second spring exerts a greater force on the armature or armatures in the second end of stroke position than the first spring exerts on the on the armature or armatures in the first end of stroke position,
and/or wherein the spring travel of the first spring is greater than the spring travel of the second spring and the spring rate of the second spring in the second end of stroke position is greater than the spring rate of the first spring in the first end of stroke position.

6. The stopper in accordance with claim 2, wherein the lifting solenoid has a stator, one or more armatures, at least one coil and at least one permanent magnet, with a spring system being provided having a first spring that exerts a force on the armature or armatures in the direction of the center of stroke position in a first end of stroke position, and having a second spring that exerts a force on the armature or armatures in the direction of the center of stroke position in a second end of stroke position, with the armature or armatures being held in a permanent magnetic manner against the spring force in both end of stroke positions in the currentless case;

wherein the stator has a soft magnetic sleeve and first and second soft magnetic front sections that form a housing in which the armature is displaceably arranged;

wherein at least one first working air gap is provided between the armature and the first front section and at least one second working air gap is provided between the armature and the second front section;

wherein at least one permanent magnet and at least one first coil and one second coil are arranged at the stator;

wherein the armature forms a first magnetic part circuit with the sleeve and the first front section in the first end of stroke position, said first magnetic part circuit at least surrounding the first coil, while the working air gap or gaps is/are opened to a maximum with the second front section;

and wherein the armature forms a second magnetic part circuit with the sleeve and the second front section in the second end of stroke position, said second magnetic part circuit at least surrounding the second coil, while the working air gap or gaps is/are opened to a maximum with the first front section, wherein at least one first permanent magnet and one second permanent magnet are provided, and wherein the first and second coils are arranged between the first and second permanent magnets in the axial direction, with the first permanent magnet putting the sleeve and the first front section under a magnetic voltage and the second permanent magnet putting the sleeve and the second front section under a magnetic voltage.

7. The stopper in accordance with claim 1, wherein the bistable lifting solenoid has an asymmetrical characteristic; and/or wherein a magnetic holding force of the lifting solenoid is highest in that end of stroke position in which the cam is in its extended position; and/or wherein the magnetic holding force in one of the end of stroke positions amounts to between 20% and 80% of the magnetic holding force in the other end of stroke position.

8. The stopper in accordance with claim 7, wherein the stator and the armature or armatures have a geometrical characteristic influence in one of the end of stroke positions, and in the first end of stroke position a conically extending working air gap, not extending in a plane perpendicular to an axle of the lifting solenoid, with the stator and the armature or armatures in the other end of stroke position, and in the second end of stroke position, having a weaker or no geometrical characteristic influence;

and/or wherein the difference between the amount of the magnetic holding force and the amount of the force that the respective spring applies differs by a maximum of 50% of the larger value in both end of stroke positions.

9. The stopper in accordance with claim 7, wherein the cam is in its extended position is achieved by a geometrical characteristic influence; and wherein the magnetic holding force in one of the end of stroke positions amounts to between 30% and 70%.

10. The stopper in accordance with claim 1, wherein the control recognizes an interruption and/or a switching off of a voltage supply of the stopper and extends the cam in response thereto, with a drop in the voltage supply being recognized by means of a flank recognition.

11. The stopper in accordance with claim 1, wherein the control is configured such that the electrical energy store or stores are charged in response to a switching on of a supply voltage and such that a reaching of a specific threshold voltage at the electrical energy store is recognized by the control, whereupon the latter discharges the electrical energy store or stores via the bistable lifting solenoid such that the cam is retracted.

12. The stopper in accordance with claim 11, wherein the electrical energy store or stores are capacitors.

13. The stopper in accordance with claim 1, wherein the bistable lifting solenoid is controlled via a MOSFET full bridge with the full bridge having two further switches via which first and second energy stores are connectable in parallel in a first switching state and are separately dischargable in a second switching state.

14. The stopper in accordance with claim 1, having a control with at least one first energy store and one second energy store, wherein the first energy store is dischargable in series by two coils of the lifting solenoid; and wherein the second energy store is dischargable by one of the two coils of the lifting solenoid, with the second energy store being selectively dischargeable by one of the two coils and/or selectively also in series by two coils of the lifting solenoid, with the electrical circuit being configured such that for the control of a first direction of movement of the lifting solenoid both energy stores are discharged in series by the two coils of the lifting solenoid, and for a control of a second direction of movement of the lifting solenoid the first energy store is discharged in series by the coils and the second energy store is discharged by only one of the two coils, with the discharge of the second energy store taking place with a time delay from the discharge of the first energy store, with the discharge of the second energy store starting even before the occurrence of the adjustment process; and/or wherein the lifting solenoid has two coils that are connected in series and that have a central tapping; and wherein at least one first energy store and one second energy store are provided, with both energy stores being discharged by the coils connected in series along a first direction of movement while on the reverse direction of movement the first energy store is first discharged by the coils connected in series and the second energy store is discharged with a time delay by the central tapping of both coils, with the discharge of the second energy store starting even before the occurrence of the adjustment process.

15. The stopper in accordance with claim 14, wherein the first direction of movement of the lifting solenoid is to extend the cam, wherein the second direction of movement of the lifting solenoid is to retract the cam; and wherein both energy stores are discharged by the coils connected in series along the first direction of movement to extend the cam, and on the reverse direction of movement, to retract the cam.

16. The stopper in accordance with claim 1, having means for a position detection of the stopper, wherein the control takes account of location information acquired by means of the means for position detection in the control of the bistable lifting solenoid, with the control having a microcontroller that is connected to the means for position detection; and/or wherein the cam has a damping mechanism and/or is connected to same.

17. The stopper in accordance with claim 1, wherein the electrical energy stores are capacitors.

18. A control for an electromagnetic stopper for stopping and/or for separating cargo carriers and/or cargo conveyed on a continuously operated cargo conveyor system, comprising:

a bistable lifting solenoid having at least one coil and at least one permanent magnet;
a cam that is retractable and extendable with aid of the lifting solenoid; and
one or more electrical energy stores; wherein
the control discharges the energy store or the energy stores via the at least one coil of the lifting solenoid with aid of switches such that the cam is extended, and wherein the control recognizes an interruption and/or a switching off of a voltage supply of the stopper and extends the cam in response thereto, with a drop in the voltage supply being recognized by means of a flank recognition.

19. A cargo conveyor system having a continuously operated cargo conveyor route for conveying cargo and/or cargo carriers, having one or more stoppers for stopping and/or separating the cargo and/or the cargo carriers, the stoppers comprising:
a bistable lifting solenoid having at least one coil and at least one permanent magnet;
a cam that is retractable and extendable with aid of the lifting solenoid;
one or more electrical energy stores; and
a control that discharges the energy store or the energy stores via the at least one coil of the lifting solenoid with aid of switches such that the cam is extended, wherein the bistable lifting solenoid has two end of stroke positions, with a spring system being provided that preloads one or more armatures of the bistable lifting solenoid out of the end of stroke positions in a direction of a center of stroke position.

* * * * *